United States Patent
Collins

(10) Patent No.: US 6,862,453 B2
(45) Date of Patent: Mar. 1, 2005

(54) SYSTEM AND METHOD FOR DISTRIBUTED CALL PROCESSING USING A DISTRIBUTED TRUNK IDLE LIST

(75) Inventor: David Allan Collins, Garland, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 502 days.

(21) Appl. No.: 10/039,186

(22) Filed: Dec. 31, 2001

(65) Prior Publication Data
US 2003/0125032 A1 Jul. 3, 2003

(51) Int. Cl.[7] .................................................. H04Q 7/20
(52) U.S. Cl. ................. 455/453; 455/450; 455/426.1; 455/452.1; 370/229; 370/400; 370/410; 370/244; 379/242; 379/221.03; 379/221.04; 379/221.07
(58) Field of Search ................................ 455/453, 450, 455/426.1, 560, 452.2; 370/229, 400, 410, 244; 379/242, 221.03, 221.04, 221.07

(56) References Cited

U.S. PATENT DOCUMENTS

| | | | | |
|---|---|---|---|---|
| 6,570,881 B1 | * | 5/2003 | Wils et al. | 370/410 |
| 6,608,812 B1 | * | 8/2003 | Wils et al. | 370/217 |
| 6,711,171 B1 | * | 3/2004 | Dobbins et al. | 370/400 |
| 6,731,599 B1 | * | 5/2004 | Hunter et al. | 370/229 |
| 6,735,299 B2 | * | 5/2004 | Krimstock et al. | 379/265.11 |
| 2001/0002194 A1 | * | 5/2001 | Rose | 370/397 |

* cited by examiner

Primary Examiner—William Trost
Assistant Examiner—Danh C Le

(57) ABSTRACT

A controller that monitors usage status of trunk lines associated with a switch that operates to handle call connections between calling devices and called devices on trunk lines associated therewith. An exemplary controller comprises N call application nodes capable of executing trunk idle list server applications that allocate ones of the trunk lines to the call connections, wherein a first trunk idle list server application is executed on a first call application node and is associated with a second trunk idle list server application executed on a separate second call application node. The first and second trunk idle list server applications thereby form a first load sharing group server application, that operates to receive a trunk line allocation request from a call process being executed within the switch and selects either the first or second trunk idle list server application to allocate a trunk line to a call connection associated with the trunk line allocation request according to a load distribution algorithm.

22 Claims, 8 Drawing Sheets

SYSTEM AND METHOD FOR DISTRIBUTED CALL PROCESSING USING A DISTRIBUTED TRUNK IDLE LIST

CROSS-REFERENCE TO RELATED APPLICATIONS

The present invention is related to those disclosed in the following U.S. Non-Provisional patent applications:

Ser. No. 10/038,878 filed concurrently herewith, entitled "SYSTEM AND METHOD FOR DISTRIBUTED CALL PROCESSING USING LOAD SHARING GROUPS";

Ser. No. 10/038,872 filed concurrently herewith, entitled "DISTRIBUTED IDENTITY SERVER FOR USE IN A TELECOMMUNICATION SWITCH";

Ser. No. 10/038,879 filed concurrently herewith, entitled "SYSTEM AND METHOD FOR PROVIDING A SUBSCRIBER DATABASE USING GROUP SERVICES IN A TELECOMMUNICATION SYSTEM."

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to telecommunication systems and, more specifically, to a telecommunication system that uses a distributed trunk idle list to distribute call processing functions and call traffic in a telecommunication switch.

BACKGROUND OF THE INVENTION

Wireless service providers continually try to create new markets and to expand existing markets for wireless services and equipment. One important way to accomplish this is to improve the performance of wireless network equipment while making the equipment cheaper and more reliable. Doing this allows wireless service providers to reduce infrastructure and operating costs while maintaining or even increasing the capacity of their wireless networks. At the same time, the service providers are attempting to improve the quality of wireless service and increase the quantity of services available to the end-user.

The mobile switching of a wireless network provides connections between a number of wireless network base stations and the public switched telephone network. Calls originated by or terminated at a cell phone or other mobile station are handled in the mobile station by a number of call processing client applications. A conventional mobile station typically contains a large switching fabric controlled by a main processing unit (MPU) that contains a large number of data processors and associated memories, often in the form of ASIC chips. Each of these MPU processors contains a call process client application for controlling the flow of control signals of a single call. Each call process client application in turn communicates with a call process server application that controls the flow of control signals for a large number of calls.

Thus, when a particular event occurs during a phone call (e.g., the call set-up, the invocation of three-way calling, call disconnection, or the like), control signals associated with the event are relayed from the mobile station to the call process client application in the mobile switching center (MSC). This call processing client application then relays the control signals to the call process server application, which actually performs the call processing service requested by the control signals.

Unfortunately, in large capacity systems, bottlenecks may develop around the call process server applications. Each call process client application must communicate with a particular piece of server hardware that is executing the call process server application. Due to the random nature of the start and stop of phone calls, in large systems, some servers may be near capacity and develop bottlenecks, while other servers still have plenty of adequate bandwidth. Moreover, a system failure in a particular piece of server hardware results in the loss of all call processes being handled by a call process server application being executed on the failed server.

For example, in conventional call processing applications, an allocated trunk line is associated with call state data. When a new call originates, an idle trunk line is allocated using a trunk idle list server and then associated with the call state data. The allocated trunk line is released when the call ends. Conventional approaches to managing idle and allocated trunk lines and the associated data utilized a single server which maintained the allocations and releases of trunk lines and supported the reading and writing of the associated data. These approaches represent a single point of failure. Single servers have been improved through the use of backup servers, so that if the primary server fails the backup takes over. However, this approach is a bottleneck in terms of system performance and is not very scalable. As more and more call traffic is handled by a switch, the performance of a single server declines accordingly.

Therefore, there is a need for improved wireless network equipment and services. In particular, there is a need for mobile switching centers that are highly reliable and minimally susceptible to bottleneck conditions during periods of high call traffic volume. More particularly, there is a need for an improved trunk idle list server architecture for use in mobile switching centers and other similar switching devices.

SUMMARY OF THE INVENTION

To address the above-discussed deficiencies of the prior art, it is a primary object of the present invention to provide a controller, for use with a telecommunications switch, that operates to monitor usage status of trunk lines associated with the switch. The switch operates to handle call connections between calling devices and called devices on associated trunk lines. The controller operates, in part, to enhance switch efficiency and reliability associated with allocating responsibility for the associated trunk lines.

The controller comprises N call application nodes capable of executing trunk idle list server applications that allocate ones of the trunk lines to the call connections, wherein a first trunk idle list server application is executed on a first call application node and is associated with a second trunk idle list server application executed on a separate second call application node. The first and second trunk idle list server applications form a load sharing group server application that operates to (i) receive a trunk line allocation request from a call process being executed within the switch and (ii) select either the first or second trunk idle list server application to allocate a trunk line to a call connection associated with the trunk line allocation request according to a load distribution algorithm.

A primary object of the present invention is to provide a group policy that permits a variable number of server applications to join a Mapped Resource Group (MRG). This group policy permits groups of servers, both primary and backup, to join the MRG, and provides a mapping of specific servers that manage specific trunk groups to enable client applications to efficiently allocate and release trunk lines. This group policy enables transparency of server configuration to client applications, allowing server applications to be added, removed, maintained, or compensated for, such as in the event of a failure. When configuration changes occur, the MRG policy automatically redistributes trunk group responsibility across selected ones of available servers, allowing the controller hereof to distribute servers across a communications network to avoid a single point of failure, and to provide a performance efficient mechanism for the allocation of trunk lines.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "controller," "processor" and "application" mean any device, system or part thereof that controls at least one operation, such a device may be implemented in hardware, firmware or software, or some combination of at least two of the same. It should be noted that the functionality associated with any particular controller, processor or application may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunications network.

In the disclosure that follows, a group services framework for performing various distributed call processing functions is implemented in a mobile switching center of a wireless communication network. This is by way of illustration only and should not be construed so as to limit the scope of the invention. Those skilled in the art will understand that the group services framework descried below may be implemented in other types of telecommunication devices, including many varieties of switches, routers and the like.

Figure 1:
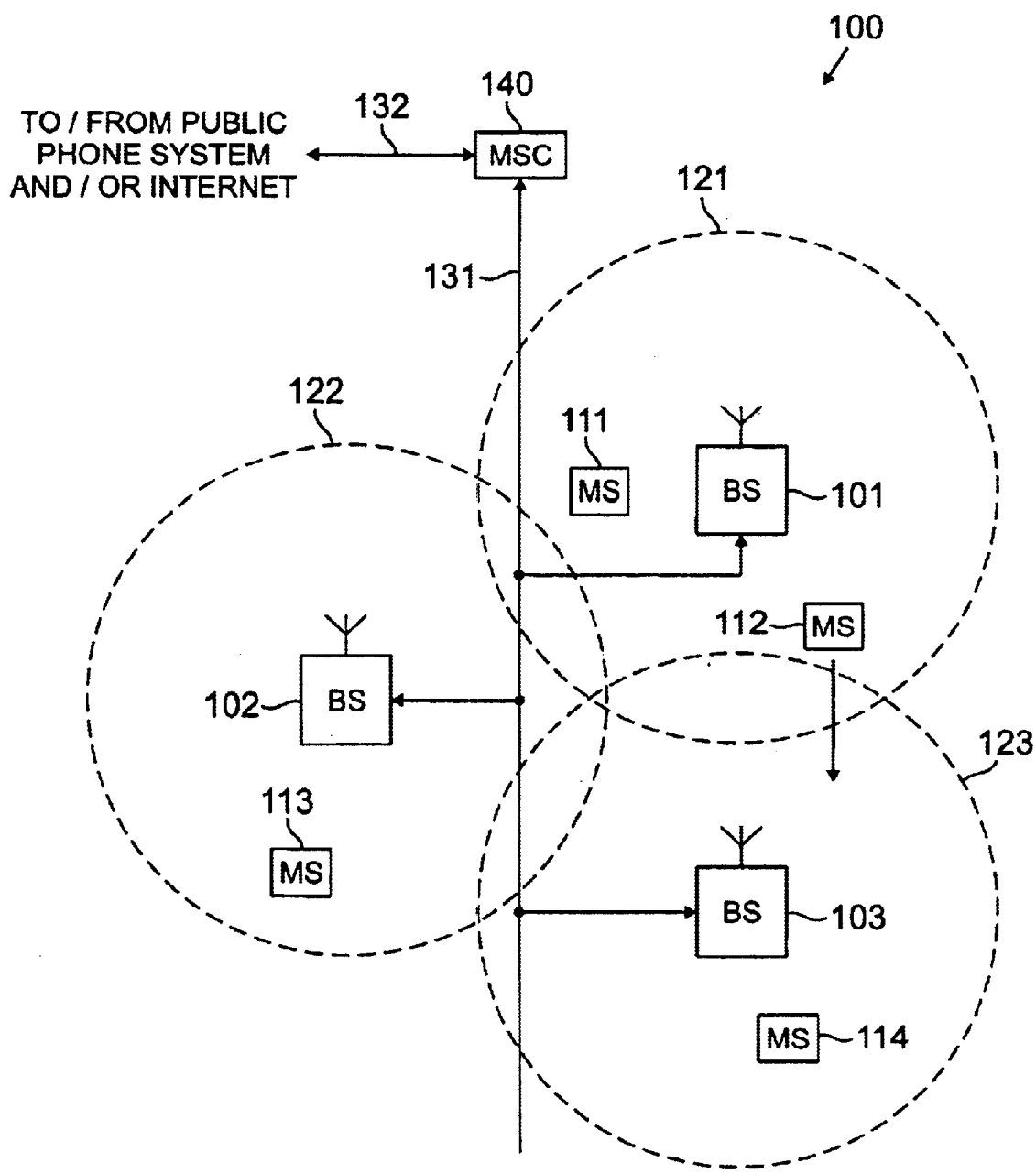
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 communicate with a plurality of mobile stations (MS) 111–114 over, for example, code division multiple access (CDMA) channels. Mobile stations 111–114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121–123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC)

and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication trunk lines 131, mobile switching center (MSC) 140, and communication trunk lines 132. Trunk lines 131 also provide connection paths to transfer control signals between MSC 140 and BS 101, BS 102 and BS 103 that are used to establish connections for voice and data circuits between MSC 140 and BS 101, BS 102 and BS 103 over communication trunk lines 131 and between MSC 140 and the Internet or the PSTN over communication trunk lines 132. In some embodiments of the present invention, communication trunk lines 131 may be several different data links, where each data link couples one of BS 101, BS 102, or BS 103 to MSC 140.

Trunk lines 131 and 132 comprise one or more of any suitable connection means, including a T1 line, a T3 line, a fiber optic link, a network packet data backbone connection, or any other type of data connection. Those skilled in the art will recognize that the connections on trunk lines 131 and 132 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on trunk lines 131 and 132 may provide a transmission path for transmission of analog or digital control signals in a suitable signaling protocol.

Figure 2:
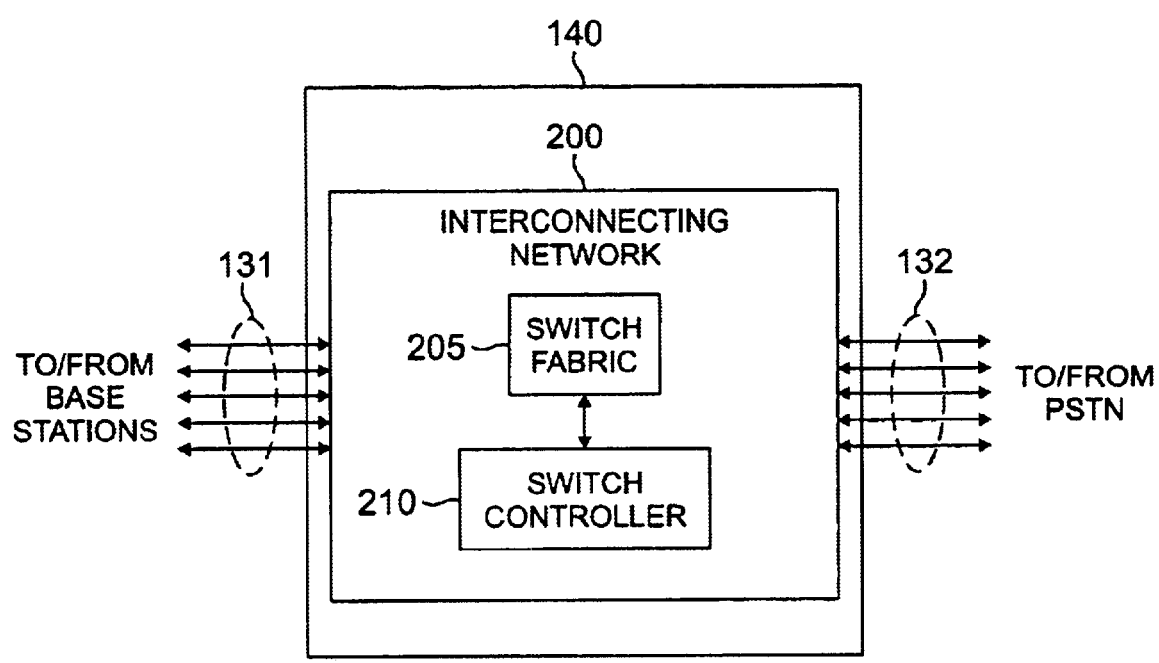
FIG. 2 illustrates an exemplary mobile switching center in greater detail according to one embodiment of the present invention.

FIG. 2 illustrates exemplary mobile switching center 140 in greater detail according to one embodiment of the present invention. MSC 140 includes interconnecting network 200, among other things. Interconnecting network 200 comprises switch fabric 205 and switch controller 210, which together provide switch paths between communication circuits in trunk lines 131 and 132. MSC 140 provides services and coordination between the subscribers in wireless network 100 and external networks, such as the PSTN or Internet. Mobile switching centers similar to MSC 140 are well known to those skilled in the art.

When a wireless network subscriber turns on his or her mobile station (e.g., cell phone) or fixed access terminal, radio messages over the air interface inform the base station that the mobile station (or fixed access terminal) is joining the network. However, a connection is not automatically made to voice or data traffic carrying circuits in trunk lines 131–132. A voice or data traffic connection to the public switched telephone network (PSTN) or the Internet is not needed until the subscriber places a call (e.g., dials a phone number) or accesses the Internet.

However, even when the phone is idle, certain information about the subscriber (i.e., subscriber data) must be retrieved and stored in either the base station or in MSC 140, or both, in order to authenticate the subscriber, gather billing information, identify the services available to the subscriber, determine capabilities of the mobile station, and the like. The control signals (as opposed to voice and data traffic) required to do this are also carried over trunk lines 131 and 132. After the subscriber data is stored in memory in MSC 140, it is available for use by a variety of call processing client (CPC) applications that may be initiated by the subscriber or another device while the mobile station is still active.

For example, when MS 111 is first turned ON, a call process is set up in MSC 140 for MS 111 and subscriber data (e.g., billing information) is stored in MSC 140 that may be accessed by the call process or other call applications that provide particular types of call services. If the subscriber dials a phone number on MS 111 or a call is received from the PSTN directed to MS 111, the call process for MS 111 handles the establishment of a call connection on one of the trunk lines in trunk line 131 and one of the trunk lines in trunk line 132. The MS 111 call process executed in MSC 140 maintains all state information related to the call and to MS 111 and handles all other applications required by MS 111, including three-way calls, voice mail, call disconnection, and the like.

In order to handle a large amount of call traffic, it is necessary to distribute the many active call processes and call service applications handled by MSC 111 across a number of call application nodes. The call services may include application for accessing a subscriber database, selecting (or de-selecting) trunk, lines, retrieving and maintaining call identity information, and the like. The present invention provides methods and apparatuses for distributing call processes and call service applications across multiple call application nodes in a highly reliable and redundant manner. This is accomplished by a distributed network of redundant servers in which call traffic is distributed in order to increase the call-handling capacity of MSC 140. The redundancy of the distributed servers is transparent to both the call process client applications that require a service and the call process server applications that provide the service. It also decreases the complexity of both the client and server applications.

Figure 3:
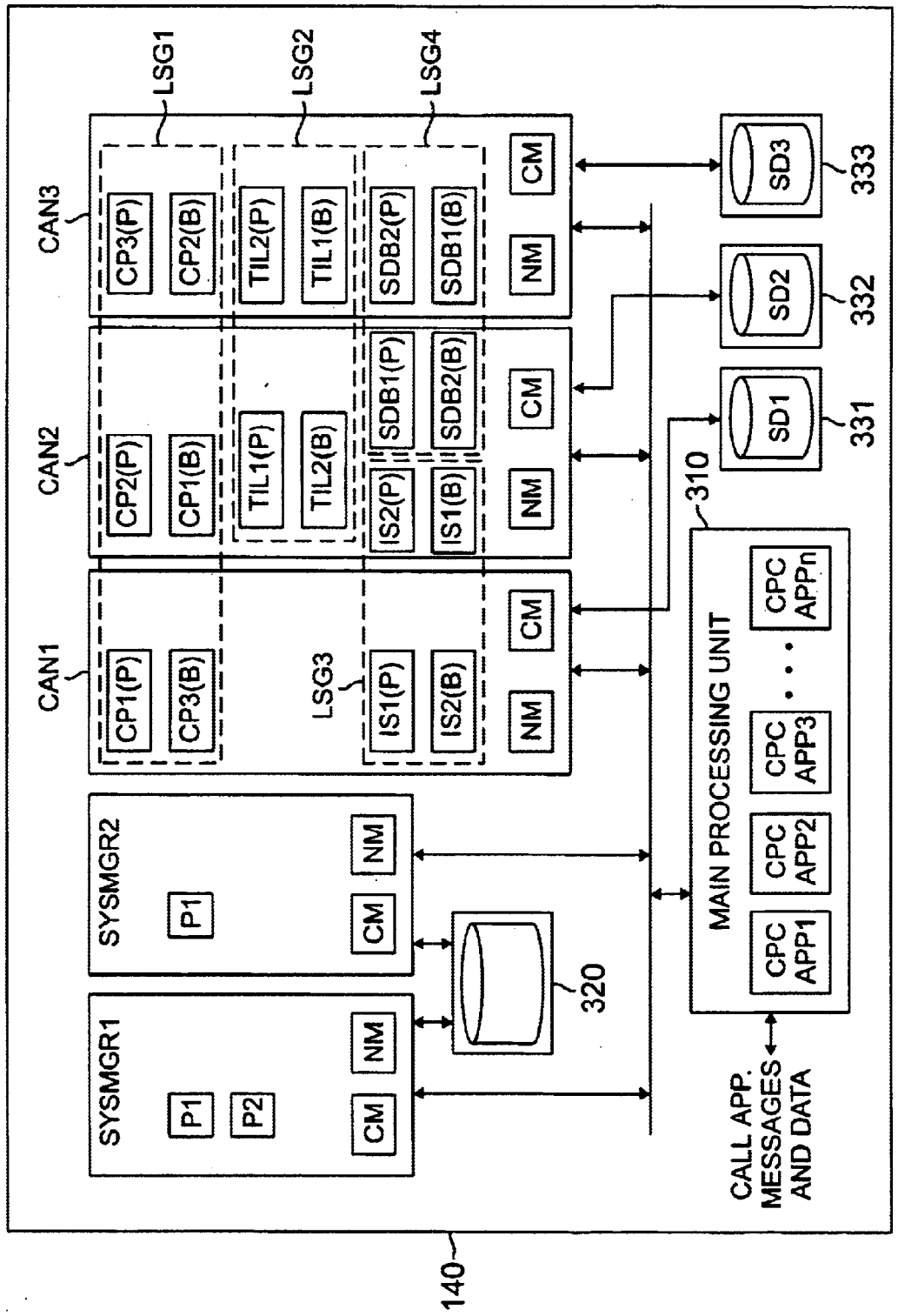
FIG. 3 illustrates selected portions of a mobile switching center that perform distributed call processing using group services according to the principles of the present invention.

FIG. 3 illustrates in greater detail selected portions of exemplary mobile switching center 140 that perform distributed call processing using group services in accordance with the principles of the present invention. MSC 140 comprises main processing unit (MPU) 310, system manager node 1 (SYSMGR1), optional system manager node 2 (SYSMGR2), and master database 320. MSC 140 also comprises a plurality of call application nodes (CANs), including CAN1, CAN2, and CAN3, and a plurality of local storage devices (SDs), namely SD1, SD2, and SD3, that are associated with CAN1, CAN2 and CAN3. Master database 320 may be used as a master software repository to store databases, software images, server statistics, log-in data, and the like. SD1–SD3 may be used to store local capsules, transient data, and the like.

Each one of system manager nodes 1 and 2 and CAN1–CAN3 executes a configuration management (CM) process that sets up each node with the appropriate software and configuration data upon initial start-up or after a reboot. Each node also executes a node monitor (NM) process that loads software and tracks processes to determine if any process has failed. System manager nodes 1 and 2 execute a first arbitrary process, P1, and system manager node 1 also executes a second arbitrary process, P2.

In accordance with the principles of the present invention, call application nodes 1–3 (CAN1–CAN3) also execute a number of call process (CP) server applications organized as primary and backup processes that are available as distributed group services to 1 to N call process client (CPC) applications, namely CPC APP1–CPC APPn in main processing unit 310. The N call application nodes (e.g., CAN1–CAN3) are separate computing nodes comprising a processor and memory that provide scalability and redundancy by the simple addition of more call application nodes.

Each of the N call process client (CPC) applications, namely CPC APP1–CPC APPn in MPU 310 handles the control signals and messages related to a single call associated with a mobile station. Each of CPC APP1–CPC APPn establishes a session with a load sharing group, which assigns the call to a particular one of the primary-backup group call process server applications, CP1, CP2, or CP3. The selected call process server application actually performs the call process services/functions requested by the call process client application.

In the illustrated embodiment, three exemplary call process server applications are being executed, namely CP1, CP2, and CP3. Each of these processes exists as a primary-backup group. Thus, CP1 exists as a primary process, CP1(P), and a backup process, CP1(B). Similarly, CP2 exists as a primary process, CP2(P), and a backup process, CP2(B), and CP3 exists as a primary process, CP3(P), and a backup process, CP3(B). In the illustrated embodiment, CP1(P) and CP1(B) reside on different call application nodes (i.e., CAN1 and CAN2). This is not a strict requirement: CP1(P) and CP1(B) may reside on the same call application node (e.g., CAN1) and still provide reliability and redundancy for software failures of the primary process, CP1(P). However, in a preferred embodiment of the present invention, the primary process and the backup process reside on different call application nodes, thereby providing hardware redundancy as well as software redundancy. Thus, CP1(P) and CP1(B) reside on CAN1 and CAN2, CP2(P) and CP2(B) reside on CAN2 and CAN3, and CP3(P) and CP3 (B) reside on CAN3 and CAN1.

Together, CP1, CP2 and CP3 form a supergroup for load sharing purposes. Thus, CP1(P) and CP1(B), CP2(P) and CP2(B), and CP3(P) and CP3(B) are part of a first load sharing group (LSG1), indicated by the dotted line boundary. Additionally, CAN1–CAN3 host three other load sharing groups, namely, LSG2, LSG3, and LSG4. LSG2 comprises two trunk idle list (TIL) server applications, namely TIL1 and TIL2. TIL1 exists as a primary process, TIL1(P), on CAN2 and a backup process, TIL1(B), on CAN3. TIL2 exists as a primary process, TIL2(P), on CAN3 and a backup process, TIL2(B), on CAN2. Similarly, LSG3 comprises two identity server (IS) applications, namely IS1 and IS2. IS1 exists as a primary process, IS1(P), on CAN1 and a backup process, IS1(B), on CAN2 and IS2 exists as a primary process, IS2(P), on CAN2 and a backup process, IS2(B), on CAN1. Finally, LSG4 comprises two subscriber database (SDB) server applications, namely SDB1 and SDB2. SDB1 exists as a primary process, SDB1(P), on CAN2 and a backup process, SDB1(B), on CAN3 and SDB2 exists as a primary process, SDB2(P), on CAN3 and a backup process, SDB2(B), on CAN2.

A group service provides a framework for organizing a group of distributed software objects in a computing network. Each software object provides a service. In addition, the group service framework provides enhanced behavior for determining group membership, deciding what actions to take in the presence of faults, and controlling unicast, multicast, and groupcast communications between members and clients for the group. A group utilizes a policy to enhance the behavior of the services provided by the group. Some of these policies include primary-backup for high service availability and load sharing for distributing the loading of services within a network.

Call processing server applications, such as CP1–CP3, IS1–IS2, and TIL1–TIL2, located within a computing network provide services that are invoked by client applications, such as CPC APP1–CPC APPn. As shown in FIG. 3, the call processing server applications are organized into primary-backup groups configured as a 1+1 type of primary-backup group. There are multiple numbers of these primary-backup groups and the exact number is scalable according to the number of processes and/or computing nodes (CANs) that are used. All of the primary-backup groups are themselves a member of a single load sharing group (e.g., LSG1, LSG2, LSG3, LSG4).

It is important to note that while the call process client applications, CPC APP1–CPC APPn, are clients with respect to the call process server applications, CP1, CP2, and CP3, a server application may be a client with respect to another server application. In particular, the call process server applications CP1–CP3 may be clients with respect to the trunk idle list server applications, TIL1 and TIL2, the subscriber database server applications, SDB1 and SDB2, and the identity server applications, IS1 and IS2.

A client application establishes an interface to the load sharing group. When a new call indication is received by the client application, the client application establishes a session with the load sharing group according to a client-side load sharing policy. The initial policy is round-robin (i.e., distribution of new calls in sequential order to each CAN), but other policies may be used that take into account the actual loading of the different primary-backup groups.

The client application associates the session with the new call and sends messages associated with the call over the session object. The client application also receives messages from the primary-backup group via the session established with the primary-backup group. Only the primary process (e.g., CP1(P)) of the primary-backup group joins the load sharing group (e.g., LSG1). For a variety of reasons, the application containing the primary may be removed from service. The server application may elect to not accept any new calls by leaving the load sharing group. However, the client applications may still maintain their session with the primary-backup group for existing calls. This action is taken because new call traffic may be lost if the singleton primary also fails. New calls are not distributed to the primary-backup group if it leaves the load sharing group.

If the primary of the primary-backup group that is a member of the load sharing group should fail, the backup member is informed that the primary member has failed (or left) and then assumes the role of primary member. The responsibility for these actions must be performed by the server application. It is the responsibility of the Group Service to inform the backup member that the primary member has failed or left.

As part of an online software upgrade process, one or more applications containing primary-backup groups may be removed from service, brought down, and then brought back up using a new version of software code. These groups, if their interface has not changed, join the existing load sharing group. When first started, it is required that the client interface be capable of throttling the call traffic to specific primary-backup groups. The traffic throttling is expressed as a percentage varying from 0% (no calls) to 100%. All new calls that would have been scheduled according to the scheduling algorithm are handled by this session. The throttling factor is initialized to 100% for any primary-backup group that joins the load sharing group. During on-line software upgrades, the throttling factor is adjusted to start with the no-calls case for the new software version. Any client application for the load sharing group may establish a session with a specific primary-backup group. The client may then change the throttling factor at any time. When the throttling factor is changed, all client session interfaces receive via multicast the changed throttling factor. As the throttling factor is increased, the call process server applications with the new software version may receive increasing amounts of call traffic.

Call processing communications from the client applications to the call processing server primary-backup groups must support a very high volume of calls. The group software utilizes an internal transport consisting of a multicasting protocol (simple IP multicast) and optionally a unicasting protocol. The unicasting protocol may be TCP/IP, SCTP, or other transport protocol. The multicast protocol is used for internal member communications relating to membership, state changes, and fault detection. In the absence of unicast transport, the multicast protocol is used for client/server communication streams. The unicast protocol, when provided, is used to provide a high-speed stream between clients and servers. The stream is always directed to the primary of a primary-backup group, which is transparent to both the call processing client/application and the call process (e.g., CP1, CP2, CP3, TIL1, TIL2, IS1, IS2).

AS noted above, the call processes on the call application nodes (CANs) are organized into a load sharing group. Each call process (e.g., CP1, CP2, CP3, TIL1, TIL2, IS1, IS2) is itself a primary-backup group. Both members of the primary-backup group may provide the service but only the primary of the group receives messages and thus actually provides the service. When a member of the group is selected as the primary, it registers one or more interface streams for the group. Each stream is a separate interface for some call processing service.

The call processing client application (e.g., CPC APP1, CPC APP2) in MSC 140 receives a new call indication and uses the group service to select an interface with a call application node (i.e., server) to handle the new call. The call process on each server (CAN) is a member of a load sharing group and a particular call application node (CAN) is selected using a round-robin algorithm from the perspective of the call process client application. For the particular primary-backup group that is selected a session is returned to the call processing client application. When the session is established with the primary-backup call process server group, the call processing client application then opens an interface to a particular member (representing an interface to a primary-backup group) and obtains a session interface. Each call processing server sends a message related to the new call over the session interface. Any subsequent transactions associated with the call are sent over the same session object.

The call process server (i.e., primary-backup group) may send asynchronously messages over the session using one or more of the defined stream interfaces. The primary member of the call processing server group receives the transactions. The backup group member does not receive transactions. The primary group member sends updates to the backup group member. The primary group member decides when updates are sent to the backup group member. The primary starts sending updates when a call has been answered. Prior to the call being answered, the call is defined as being a transient call. After the call has been answered, the call is defined as being a stable call.

If the primary group member should fail, then the backup group member becomes the new primary member. All transient call information during the fail-over period (the time between when the primary fails and the backup is changed to be the new primary) can be lost. All stable call information must be maintained by the backup. However, some stable call information may be lost if the backup has not received updates.

Advantageously, the present invention has no limitations on the scalability of the system and the system size is hidden from both and the primary-backup group server applications and call process client applications. The present invention eliminates any single point of failure in the system. Any failure within the system will not affect the system availability and performance.

New call application nodes (CANs) and additional primary-backup group server applications (e.g., CP1, CP2, CP3, TIL1, TIL2, IS1, IS2) may be added dynamically to the load sharing groups and can start servicing new call traffic. Call process client applications are not affected by the additions of new servers. If a server should fail, its backup assumes responsibility for the load. This provides high availability for the servicing of each call and minimizes dropped calls.

Server applications create a primary-backup group and then join the primary-backup group. This action creates the server side policy containing the objects shown in FIG. 4A. The group policy distributes invocations from clients, participates in a distributed election of the primary in the group, maintains group membership, and monitors for group member failures. Server applications join a load sharing group using a group adaptor object as a proxy member of the load sharing group. The group adaptor object is set with the name of the primary-backup group prior to joining the load sharing group.

Client applications establish a client interface to the load sharing group and begin by opening a session. The act of opening a session utilizes a client side load sharing policy to select one of the members of the load sharing group. The internal load sharing client policy architecture is shown in FIG. 4C. The session object itself encapsulates a client side policy that connects to a particular primary-backup group. The internal architecture for this client policy is shown in FIG. 4B.

Call processing client application communicate with the selected server (which is the primary within a primary-backup group). As the primary call process receives messages from the call processing client application, the primary call process sends state updates to the corresponding backup call process. If the primary call process should fail, the backup call process is automatically selected as the new primary. During the fail-over period to the new primary, the call processing client application receives an indication of the failure and may retry the send until the new primary call process is ready to receive messages. This minimizes the lost message traffic during the fail-over period. Once the call processing client application is through with the session, the call processing client application may release the session.

Figure 4A:
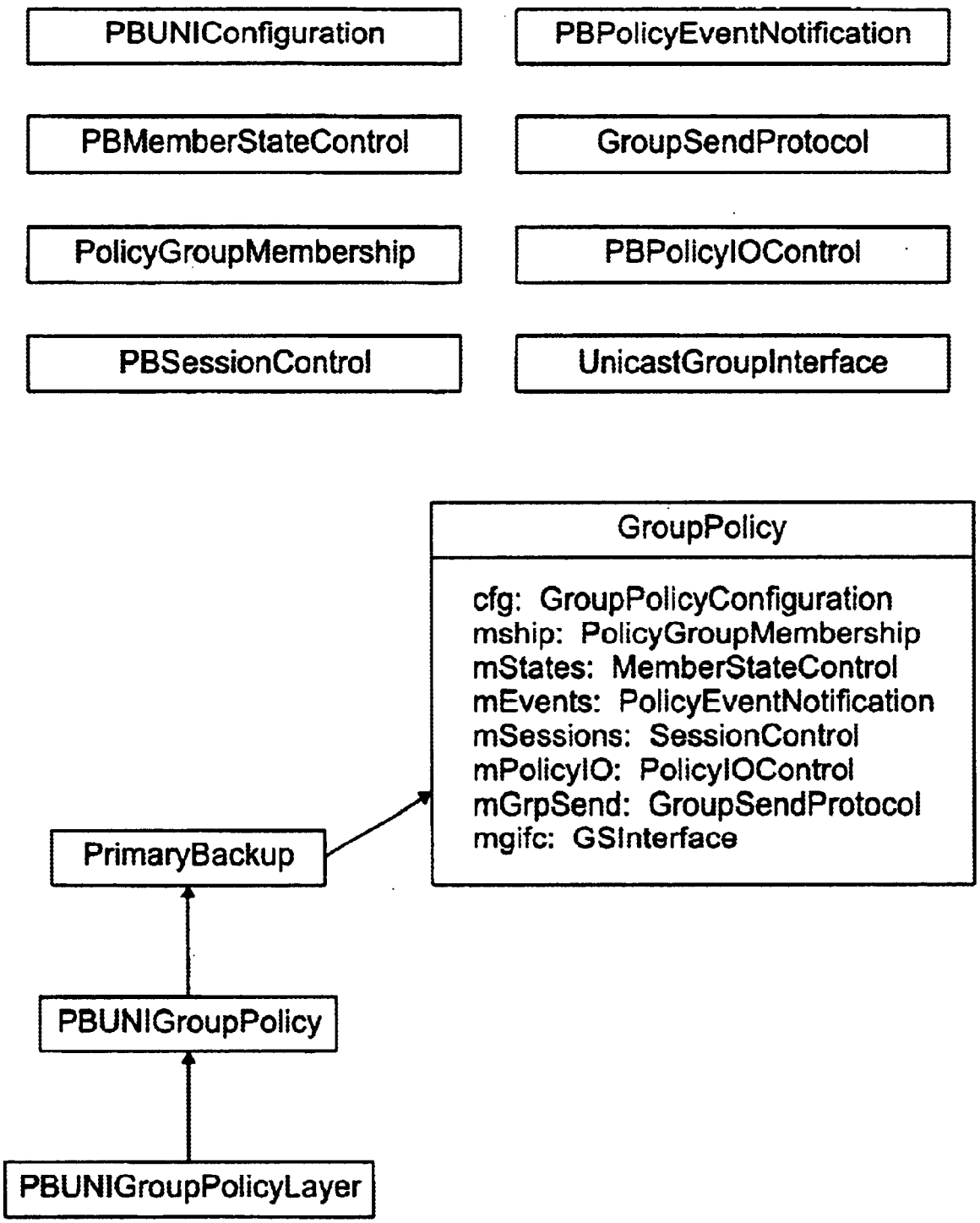
FIG. 4A is an illustration of server side internal group policy classes according to an exemplary embodiment of the present invention.
Figure 4B:
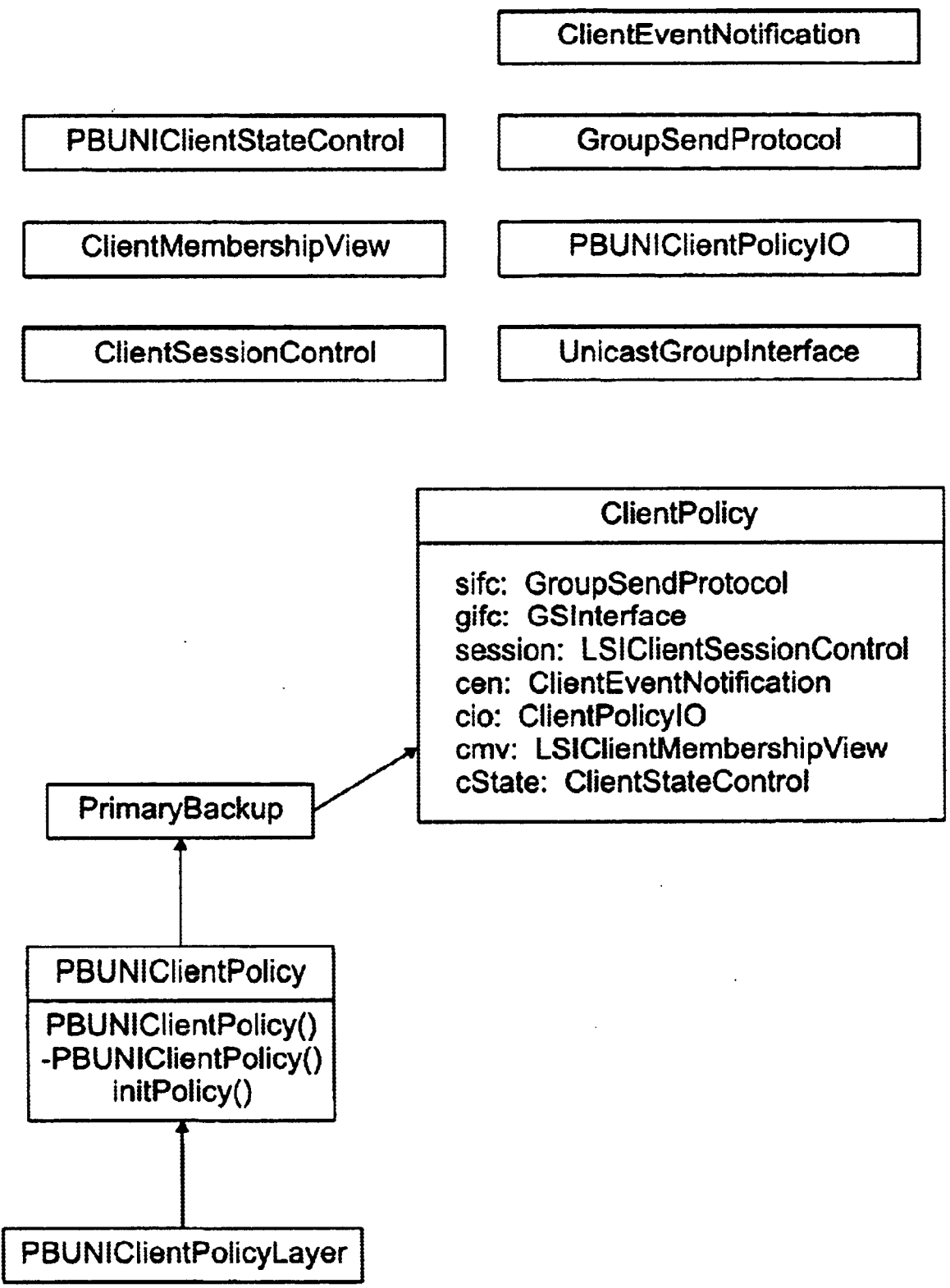
FIG. 4B is an illustration of a client side internal client policy architecture according to an exemplary embodiment of the present invention.
Figure 4C:
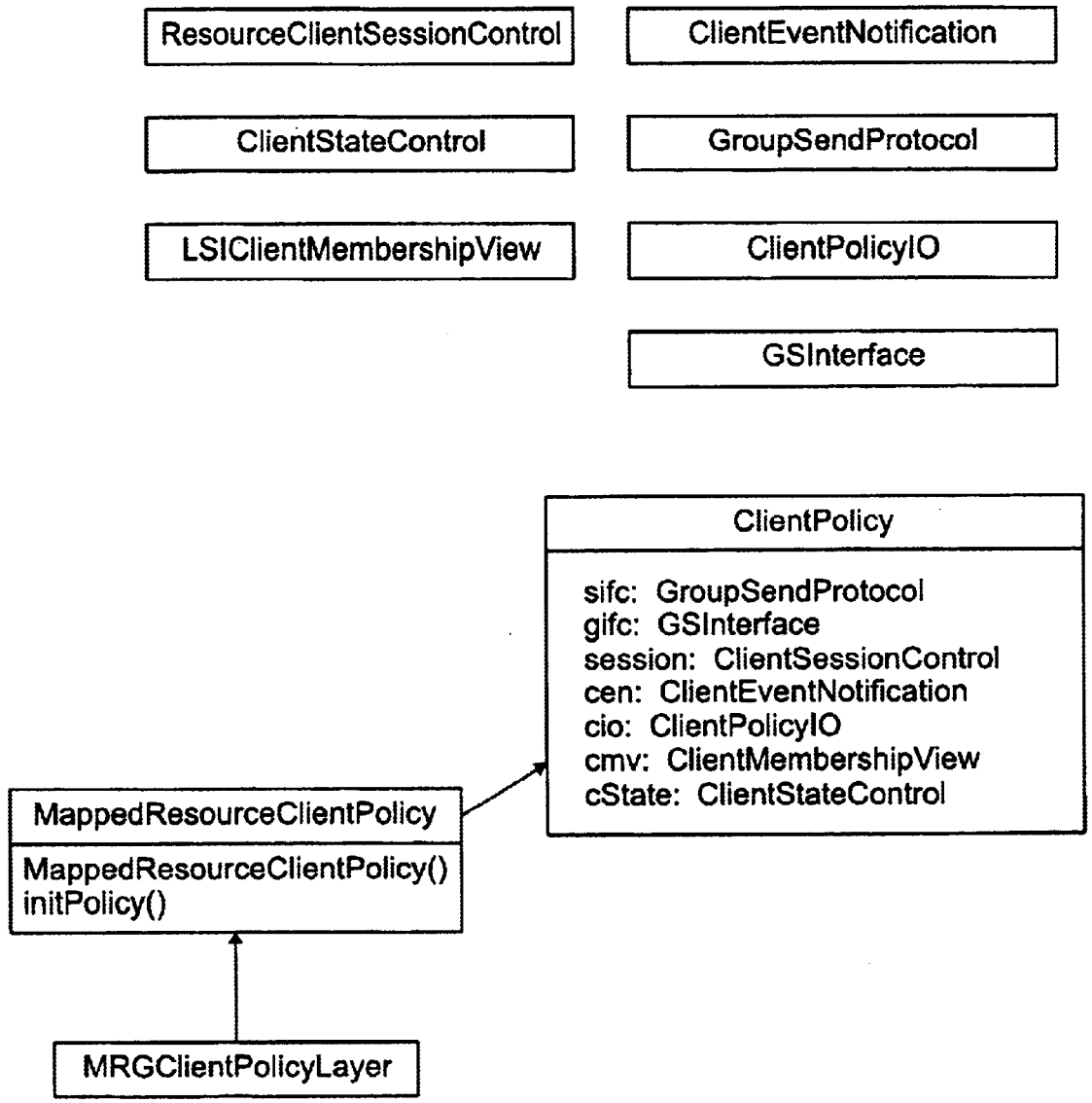
FIG. 4C is an illustration of a load sharing client side policy internal architecture according to an exemplary embodiment of the present invention.

FIG. 4A is an illustration of server side internal group policy classes according to an exemplary embodiment of the present invention. The PBUNIGroupPolicy group policy has the following internal member:

1) PBUNIConfiguration—identifies the group policy name as being "PBUNI" and specifies the QoS requirements for the communication stack for this policy.

2) PolicyGroupMembership—maintains the membership for the group and provides a membership protocol for adding new members, removing members that have left, and marking members that have failed as "FAILED".

3) PBPolicyEventNotification—provides the behavior for event notifications, such as i) when a member joins the group (recovered), ii) leaves the group (left), iii) fails (failed), or iv) has a state change.

4) PBMemberStateControl—has the state machine for primary selection in the presence of joins, exits, and failures of group members. Each local instance of this class decides which member is the primary. It is possible, due to network partitions, that there can be more than one primary at the same time.

5) PBSessionControl—controls the session establishment between call processing client applications for a primary-backup group and the group members.

6) PBPolicyIOControl—provides the primary-backup policy behavior for multicasting and sending to group members.

7) GroupSendProtocol—provides the group member protocol for sending to other members of the group and to clients of the group.

8) UnicastGroupInterface—is a group interface that provides separate interfaces to each capsule in which a group member resides.

FIG. 4B is an illustration of a client side internal client policy architecture according to an exemplary embodiment of the present invention. PBUNIClientPolicy is a primary-backup client policy in which unicast links are used to communicate with the group. General sending is sent only to the primary member and is not redundantly sent to the backup member(s). The PBUNIClientPolicy has the following members:

1) ClientMembershipView—provides a local view of the group membership but unlike GroupMembershipView, does not participate in the protocol associated with group membership.

2) PBUNIClientPolicyIO—handles I/O over unicast links to the primary member.

3) GroupSendProtocol—provides the Group Member protocol for sending to other members of the group and to clients of the group.

4) ClientSessionControl—manages sessions on the client side with group members.

5) PBUNIClientStateControl—maintains a local view of which member is the primary in a primary-backup group.

6) ClientSessionControl—manages sessions on the client side with group members.

7) UnicastGroupInterface—provides separate interfaces to each capsule in which a group member resides.

FIG. 4C is an illustration of a load sharing client side policy internal architecture according to an exemplary embodiment of the present invention. MappedResourceClienPolicy is a load sharing policy for group members who are themselves groups. MappedResourceClientPolicy provides client-side round-robin selection of members when a session to a member is opened. Each session provides a group interface to a particular group. MappedResourceClient-Policy also provides support of message throttling to each session. Throttling can vary from 0% (no messages) to 100% (all messages are sent that would normally be selected using round-robin scheduling). MappedResourceClientPolicy overrides what is in the base ClientPolicy. MappedResourceClientPolicy contains the following members:

1) ClientEventNotification—notifies both the ClientPolicy notifier and the local notifier of events.

2) ResourceClientSessionControl—returns a session using a round-robin algorithm. The session provided is an interface to another group. ResourceClientSessionControl has a running index that is used to select a new session for each open session request. ResourceClientSessionControl has a list of known interfaces called "Member Known". Member Known is a map that is indexed by the Member ID and contains a SessionCount object which contains the actual session and a reference count of the number of users of the session instance. The sessions in known are maintained even though members may leave the group. When members leave the group they are removed from being available but kept in known. This permits clients to continue to use the group interface even though they have left the load sharing group.

3) GroupSendProtocol—provides the Group Member protocol for sending to other members of the group and to clients of the group.

4) GSInterface—is the interface class to the multicast and/or unicast protocol stack(s) that are utilized by the group interfaces.

5) ClientPolicyIO—is responsible for handling client I/O.

6) ClientStateControl—is used to control the event state of the group and to retrieve the event state of the group.

Figure 4D:
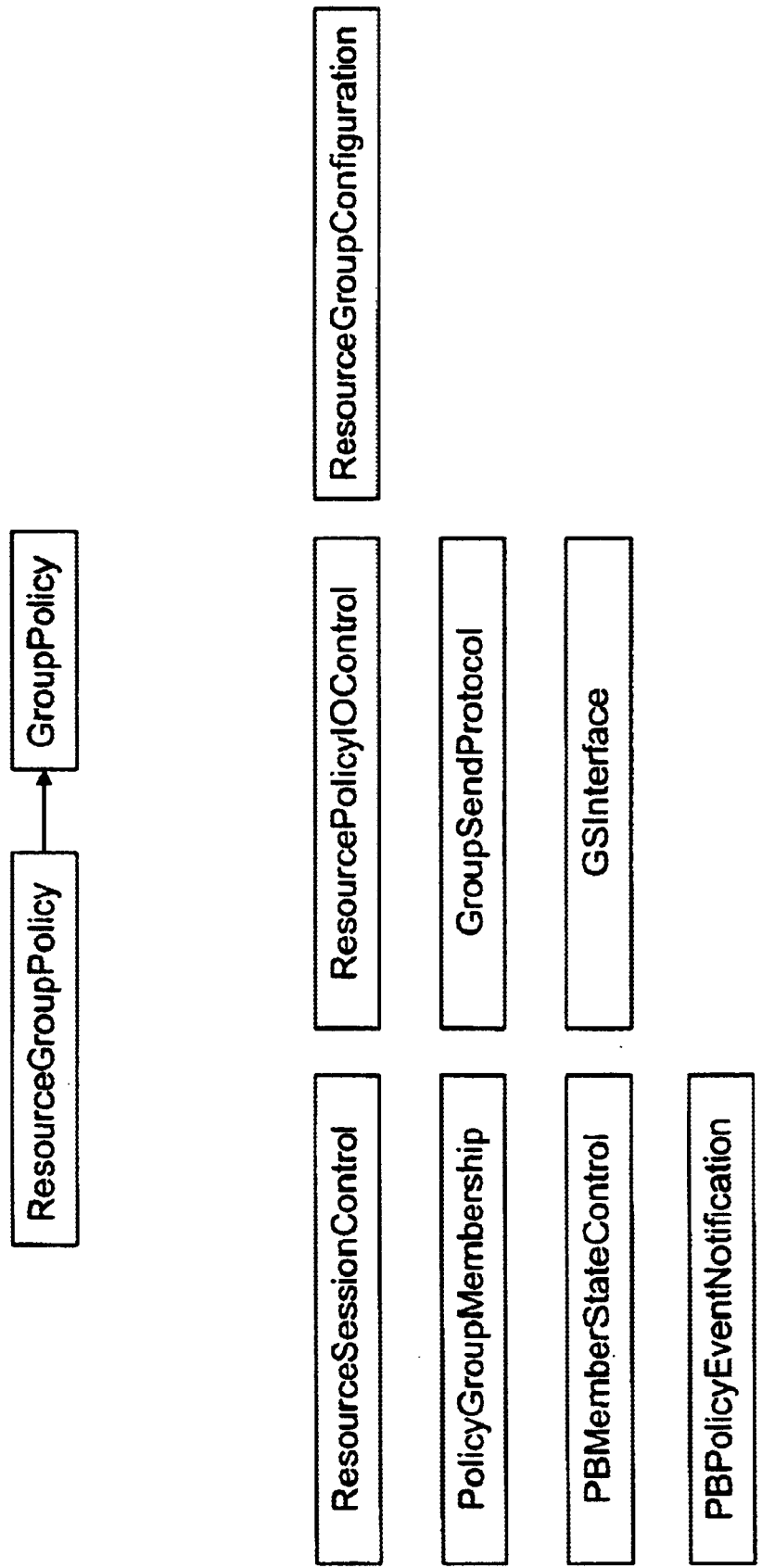
FIG. 4D is an illustration of a trunk idle list server side policy internal architecture according an exemplary embodiment of the present invention.

FIG. 4D is an illustration of a trunk idle list server side policy internal architecture according to an exemplary embodiment of the present invention. The ResourceGroupPolicy is a GroupPolicy and contains a ResourceSessionControl, ResourcePolicyIOControl, ResourceGroupConfiguration, PolicyGroupMembership, GroupSendProtocol, PBMemberStateControl, GSInterface, and a PBPolicyEventNotification. This is the server side structure for the super group.

The Trunk Idle List (TIL) Group is a super group of members, where each group is itself a primary-backup group (hereafter referred to as "the PBG member") The first PBG member to join the TIL is elected as the leader and is charged with the tasks of finding out what trunk list resources must be managed and allocating trunk idle list responsibilities for each other PBG member. The leader member of the TIL group then informs the TIL group of the list of Trunk Groups that must be managed. As each new PBG member joins the group, it is assigned a range of Trunk Groups to manage. Each trunk group contains a variable number of trunk lines. The leader PBG member informs each new PBG member of the number of trunk ines there are in each assigned trunk group.

A client application to the TIL group receives an event indicating a call origination. A call origination comes over a specific trunk within a specific trunk group. The client TIL interface is used to allocate or mark the trunk line within the trunk group as being in use. The location of the particular PBG member that manages the resource is transparent to the client. When the associated call specifies a party to be called, a trunk group is calculated and through the TIL client interface the responsible PBG member is requested to allocate any trunk within the trunk group. When the call is ended, the client application releases the trunk lines for both origination and termination by specifying the trunk group and trunk lines for all sides of the call.

In all cases the client application is unaware of which PBG trunk idle list server application is handling specific trunk groups. This permits additional servers to be added at anytime. Thus, the system can be scalable to any number of servers. Because each member consists of a primary-backup pair, and because the allocation and/or release of state data is continuously updated in the backup, a trunk idle list load sharing group according to the principles of the present invention is invulnerable to a single server failure for any one PBG member.

Figure 5:
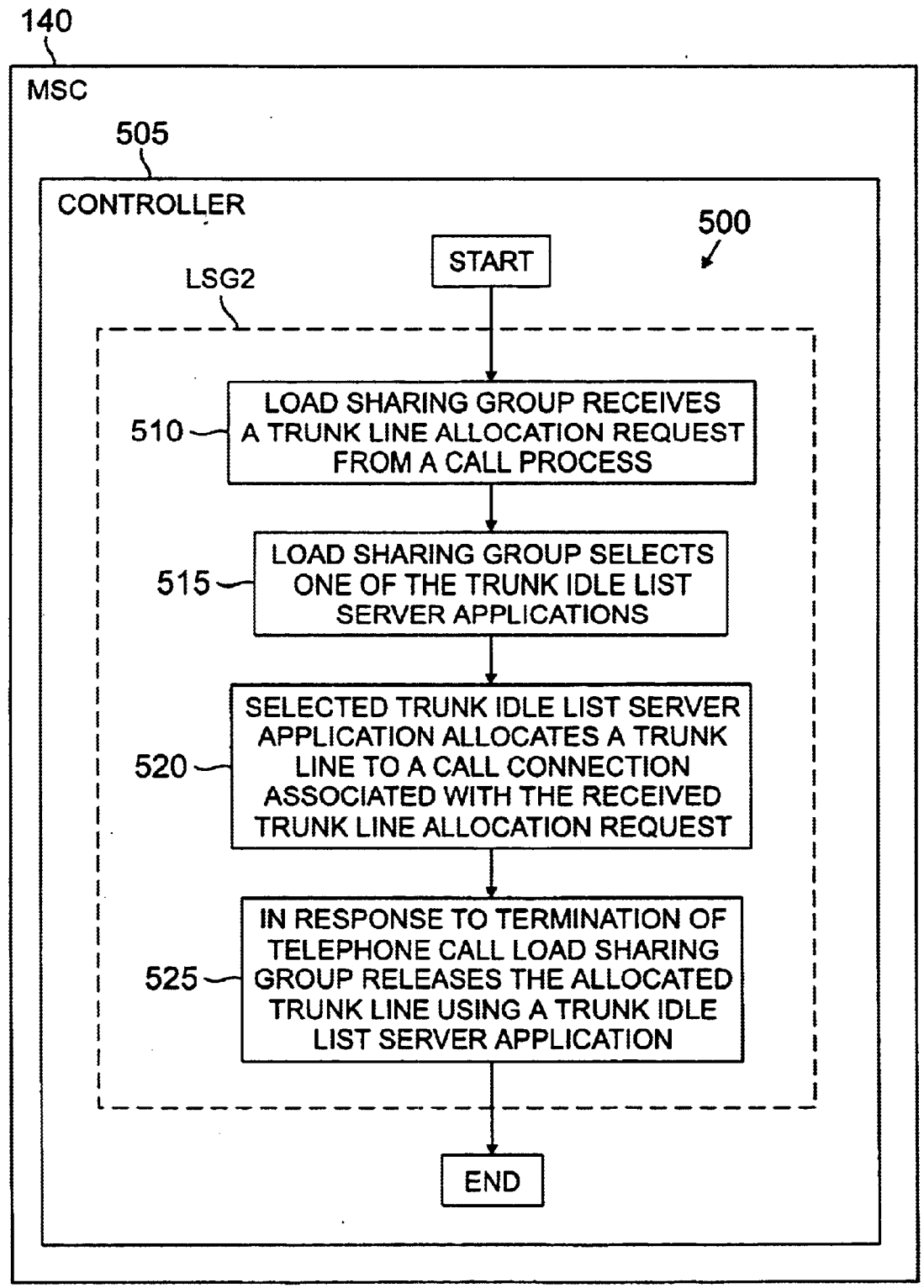
FIG. 5 is an illustration of a flow diagram of an exemplary method of operating a controller 505, which comprises at least one load sharing group, according to one embodiment of the present invention.

FIG. 5 illustrates a flow diagram (generally designated 500) of an exemplary method of operating a controller 505, comprising LSG2 of FIG. 3, according to one embodiment of the present invention. Exemplary controller 505 operates to monitor usage status of trunk lines associated with switch MSC 140, and further illustratively comprises CAN2 and CAN3, each of which is capable of executing one or more trunk idle list server applications (e.g., TIL1 and TIL2), each of which is capable of allocating ones of the trunk lines to call connections. As before, LSG2 comprises TIL1 and TIL2, wherein TIL1 executes as a primary process, TIL1(P), on CAN2 and a backup process, TIL1(B), on CAN3, and TIL2 executes as a primary process, TIL2(P), on CAN3 and a backup process, TIL2(B), on CAN2.

For purposes of the present illustration, it is assumed that MSC 140 is operating to handle call connections between calling and called devices MS 111–114 on a plurality of trunk lines 131–132 associated with MSC 140 (START Step; telephone calls are originating and terminating on the telephone trunk lines). The telephone trunk lines are organized into trunk groups, of which there may be a variable number of trunk groups, wherein each trunk group may have a variable number of trunk lines. When a telephone call is originated on a trunk line within a specific trunk group, that trunk line is suitably marked as in-use. For the telephone call to be actually connected, a terminating trunk line within a specific trunk group is allocated and marked as such. Modifying status indicia ensures that allocated trunk lines are not used to terminate other originating telephone calls.

According to the illustrated embodiment, LSG2 receives a trunk line allocation request from a call process (e.g., CP1–CP3) executing in MSC 140 (Step 510). For instance, MS 113 requests a telephone call connection with MS 112, causing BS 102 to request a trunk line allocation from LSG2 via one of CP1__CP3, all executing in MSC 140. According to the exemplary embodiment, to allocate a trunk line, a call process (e.g., CP1__CP3) may specify a specific subgroup from which an associated trunk line may suitably be allocated, or specify a specific channel to get a specific trunk line with the subgroup.

LSG2, in response to the allocation request, selects one of the trunk idle list server applications (Step 515; e.g., TIL1(P) or TIL2(P)), which operates to allocate a trunk line to a call connection associated with the trunk line allocation request, all according to a suitable load distribution algorithm (Step 520). For instance, LSG2 selects one of TIL1(P) and TIL2 (P), respectively executing in CAN2 and CAN3, which, in turn, allocates a trunk line to a call connection associated with the trunk line allocation request received from MS 113. Assuming that MS 112 is available, the telephone call connection is made between MS 113 via BS 102 and MS 112 via BS 101/BS 103. According to the exemplary embodiment LSG2 (i.e., via one of TIL1(P) or TIL2(P)) allocates the trunk line and returns the channel to the call process (e.g., CP1–CP3), along with other related data.

LSG2, in response to the termination of the telephone call, releases the trunk line using one of the trunk idle list server applications (Step 525; e.g., TIL1(P) or TIL2(P)). According to the exemplary embodiment LSG2 (i.e., via one of TIL1(P) or TIL2(P)) releases the trunk line by specifying the channel, and modifies the trunk idle list to indicate that the trunk line is not in-use.

The trunk idle list is stored in memory, and advantageously backed up, along with a the trunk idle list state, so in the event of a failure event, the current allocation list is not lost. If some part of the allocation list is lost, known memory management mechanisms may suitably be employed to recover the idle list state information. The trunk idle list is suitably distributed across multiple processes to enhance performance and reliability for call processing, and further enables the trunk idle list allocation scheme to be scalable across small system configurations and large system configurations.

Preferably, distributed member servers for the trunk idle list are assigned a flexible range of trunk groups to manage, and member servers may suitably be arranged to negotiate a range of trunk groups to be managed at run time as a function of additions, subtractions or other like modification of member servers (e.g., due to system upgrades, partitions, failures, etc.) or available resources (e.g., addition, subtraction, etc. of trunk group, trunk line or other resources).

Recall, each server application operates to maintain its associated trunk groups and related trunk lines within each trunk group. When the server application receives a specific trunk line allocation request, the trunk line is designated as allocated. When the server application receives a request for any trunk line within a specific trunk group (for terminating calls), the server application selectively allocates an idle trunk line within the specified trunk group. The server application also receives requests to release a specific trunk within a specified trunk group.

An important aspect of the present invention is the provision of a group policy that permits a variable number of server applications to join a Mapped Resource Group (MRG). This group policy permits groups of servers, both primary and backup, to join the MRG, and provides a mapping of specific servers that manage specific trunk groups to enable client applications to efficiently allocate and release trunk lines. This group policy enables transparency of server configuration to client applications, allowing server applications to be added, removed, maintained, or compensated for, such as in the event of a failure. When configuration changes occur, the MRG policy automatically redistributes trunk group responsibility across selected ones of available servers, allowing the controller hereof to distribute servers across a communications network to avoid a single point of failure, and to provide a performance efficient mechanism for the allocation of trunk lines. A further aspect hereof is the absence of limitation on system scalability, which may suitably be "hidden" from both server and client applications. There is also no single point of failure, and failure within the system will not affect system availability and performance.

Although the present invention has been described in detail, those skilled in the art should understand that they can make various changes, substitutions and alterations herein without departing from the spirit and scope of the invention in its broadest form.

What is claimed is:

1. A controller for monitoring usage status of trunk lines associated with a switch, said switch capable of handling call connections between calling devices and called devices on a plurality of trunk lines associated with said switch, said controller comprising N call application nodes capable of executing a plurality of trunk idle list server applications that allocate ones of said trunk lines to said call connections, wherein a first trunk idle list server application is executed on a first one of said N call application nodes and is associated with a second trunk idle list server application executed on a second one of said N call application nodes separate from said first call application node, said first and second trunk idle list server applications thereby forming a load sharing group server application, wherein said load sharing group server application receives a trunk line allocation request from a call process being executed in said switch and selects one of said first and second trunk idle list server applications to allocate a trunk line to a call connection associated with said trunk line allocation request according to a load distribution algorithm.

2. The controller as set forth in claim 1 wherein said first trunk idle list server application allocates trunk lines from at least one trunk group associated with said first trunk idle list server application and said second trunk idle list server application allocates trunk lines from at least one trunk group associated with said second trunk idle list server application.

3. The controller as set forth in claim 2 wherein said second trunk idle list server application comprises a second primary-backup group server application, wherein said second primary-backup group server application comprises a second primary trunk idle list server application executed on said second call application node and a second backup trunk idle list server application associated with said second primary trunk idle list server application.

4. The controller as set forth in claim 3 wherein state information associated with said second primary call process is mirrored to said second backup call process associated with said second primary call process.

5. The controller as set forth in claim 4 wherein said second backup trunk idle list server application resides on said second call application node.

6. The controller as set forth in claim 5 wherein said second backup trunk idle list server application resides on a call application node separate from said second call application node.

7. The controller as set forth in claim 2 wherein said load distribution algorithm distributes new trunk line allocation requests to said first and second trunk idle list server applications according to a trunk group associated with said trunk line allocation requests.

8. The controller as set forth in claim 2 wherein said first trunk idle server application comprises a first primary-backup group server application, wherein said first primary-backup group server application comprises a first primary trunk idle list server application executed on said first call application node and a first backup trunk idle list server application associated with said first primary trunk idle list server application.

9. The controller as set forth in claim 8 wherein trunk line state information associated with said first primary trunk idle list server application is mirrored to said first backup trunk idle list server application associated with said first primary trunk idle list server application.

10. The controller as set forth in claim 9 wherein said first backup trunk idle list server application resides on said first call application node.

11. The controller as set forth in claim 9 wherein said first backup trunk idle list server application resides on a call application node separate from said first call application node.

12. A wireless network comprising:
a plurality of base stations capable of communicating with a plurality of mobile stations in a coverage are of said wireless network; and
a mobile switching center coupled to said plurality of base stations and to a public switched telephone network by a plurality of trunk lines, wherein said mobile switching center is capable of handling call connections between calling devices and called devices on said plurality of trunk lines, said mobile switching center comprising:
a main processing unit capable of executing call process client applications, wherein each of said call process client applications is associated with one of said call connections; and
a controller comprising N call application nodes capable of executing a plurality of trunk idle list server applications that allocate ones of said trunk lines to said call connections, wherein a first trunk idle list server application is executed on a first one of said N call application nodes and is associated with a second trunk idle list server application executed on a second one of said N call application nodes separate from said first call application node, said first and second trunk idle list server applications thereby forming a load sharing group server application, wherein said load sharing group server application receives a trunk line allocation request from a call process being executed in said switch and selects one of said first and second trunk idle list server applications to allocate a trunk line to a call connection associated with said trunk line allocation request according to a load distribution algorithm.

13. The wireless network as set forth in claim 12 wherein said first trunk idle list server application allocates trunk lines from at least one trunk group associated with said first trunk idle list server application and said second trunk idle list server application allocates trunk lines from at least one trunk group associated with said second trunk idle list server application.

14. The wireless network as set forth in claim 13 wherein said second trunk idle list server application comprises a second primary-backup group server application, wherein said second primary-backup group server application comprises a second primary trunk idle list server application executed on said second call application node and a second backup trunk idle list server application associated with said second primary trunk idle list server application.

15. The wireless network as set forth in claim 14 wherein state information associated with said second primary call process is mirrored to said second backup call process associated with said second primary call process.

16. The wireless network as set forth in claim 15 wherein said second backup trunk idle list server application resides on said second call application node.

17. The wireless network as set forth in claim 16 wherein said second backup trunk idle list server application resides on a call application node separate from said second call application node.

18. The wireless network as set forth in claim 13 wherein said load distribution algorithm distributes new trunk line allocation requests to said first and second trunk idle list server applications according to a trunk group associated with said trunk line allocation requests.

19. The wireless network as set forth in claim 13 wherein said first trunk idle server application comprises a first primary-backup group server application, wherein said first primary-backup group server application comprises a first primary trunk idle list server application executed on said first call application node and a first backup trunk idle list server application associated with said first primary trunk idle list server application.

20. The wireless network as set forth in claim 19 wherein trunk line state information associated with said first primary trunk idle list server application is mirrored to said first backup trunk idle list server application associated with said first primary trunk idle list server application.

21. The wireless network as set forth in claim 20 wherein said first backup trunk idle list server application resides on said first call application node.

22. The wireless network as set forth in claim 20 wherein said first backup trunk idle list server application resides on a call application node separate from said first call application node.

* * * * *